US005714825A

United States Patent [19]

Monie

[11] Patent Number: 5,714,825

[45] Date of Patent: Feb. 3, 1998

[54] CONTACT BRUSH ADAPTED TO MOVE OVER AN ELECTRICAL TRACK ASSOCIATED THEREWITH

[75] Inventor: Jean Monie, Scionzier, France

[73] Assignee: Societe de Mecanique et de Plastiques Industriels, France

[21] Appl. No.: 536,639

[22] Filed: Sep. 29, 1995

[30] Foreign Application Priority Data

Oct. 18, 1994 [FR] France .................................. 94 12646

[51] Int. Cl.$^6$ .......................... H01R 39/28; H02K 13/10

[52] U.S. Cl. ............................ 310/248; 310/242; 439/17

[58] Field of Search .................................... 310/248, 242, 310/239, 219, 237; 439/13, 17, 19, 27, 3, 8, 18; 200/240, 277, 285, DIG. 29, DIG. 44

[56] References Cited

U.S. PATENT DOCUMENTS

| | | | |
|---|---|---|---|
| 530,717 | 12/1894 | Platt | 439/19 |
| 1,255,795 | 2/1918 | Savage | 200/277 |
| 3,902,775 | 9/1975 | Speller | 200/277 |
| 5,281,148 | 1/1994 | Thompson | 439/59 |
| 5,454,724 | 10/1995 | Kloeppel et al. | 439/17 |

*Primary Examiner*—Steven L. Stephan
*Assistant Examiner*—Jonathan D. Link
*Attorney, Agent, or Firm*—Parkhurst & Wendel

[57] ABSTRACT

A brush adapted to effect contact between an elastic metallic support and an electrical track which presents insulating parts and conducting parts. Said brush takes a form similar to that of a tip of a ball-point pen, with a metallic contact ball which is crimped in a metallic receiving shaft.

7 Claims, 4 Drawing Sheets

CONTACT BRUSH ADAPTED TO MOVE OVER AN ELECTRICAL TRACK ASSOCIATED THEREWITH

FIELD OF THE INVENTION

The present invention relates to a contact brush adapted to move over an electrical track associated therewith, and forming for example part of a commutation system such as a programmer for household equipment, a system for controlling motorization of movement for devices such as an electric window raiser for automobiles, a windscreen wiper for vehicles, an electrically adjusted seat, an electric door-locking system, position servo-control equipment, or the like.

BACKGROUND OF THE INVENTION

In these commutation systems, it is well known to use electrical tracks constituted by one or more conducting tracks, for example continuously moulded or printed, which are added on a generally rigid, insulating support. One or more metallic contact brushes, generally borne by elastic, metallic blades, move over said conducting tracks and insulating support, this generally bringing about an electrical commutation when a contact brush passes from the conducting track to the insulating support, and vice versa.

The contact brushes used in these known commutation systems are wiper brushes, of various forms and whose major drawback is that of being subject to wear, which renders them virtually unusable for certain applications where high precision and considerable reliability of each commutation are indispensable.

Such is the case in particular for any servo-control system for determining a moment as a function of a count or a comparison between two associated counts.

As the precision demanded of such systems does not tolerate any defect in count, whether by soiling of the contact or wear, a degradation of this function may have serious consequences.

Another drawback of these electrical wiper contacts according to the prior art is that they soil rapidly, thereby causing poor contacts which are particularly damaging to the functioning of the commutation device with which these wiper contacts are associated.

By way of illustration, an example of a wiper contact according to the known art is shown in vertical and longitudinal section in accompanying FIG. 2, while a small portion of the commutation device which is associated with this wiper contact is shown in perspective in accompanying FIG. 1.

Referring therefore to these FIGS. 1 and 2, reference 1 designates an insulating disc which here is assumed to be fixed in position and which bears a metallic track 2, here in the form of an annular ring provided with regularly spaced apart teeth 3. This metallic track is for example made by overmoulding and in fact it is of a very slight thickness (some microns for example) with respect to the plane upper surface of the insulating disc 1. The track may also be produced by a printing technique, printed circuit or the like.

A wiper brush contact 4, composed here of a metallic half-cylinder, moves in one direction or the other over the disc 1 and over the track 2, 3.

This brush 4 is welded beneath an elastic metallic support 5 which is concentric to the fixed disc 1 and which moves in rotation, in one direction or the other and concentrically with respect to the ring 1.

Electrical connections 6 and 7 respectively connect the track 2 and the metallic support 5 to an electrical or electronic processing member such as a pulse counter or a microprocessor.

An electrical connection is established as long as the brush 4 bears on a tooth 3 of the track 2, which closes an electrical circuit associated therewith, and such connection is cut when this brush 4 has physically and electrically left this tooth 3 to bear solely on the insulating disc 1, or more precisely on the insulating gap included between two successive conducting teeth 3. One thus passes for example from a first logic level "1" to the other logic level "0", these successive transitions generating a train of electrical pulses or logic states which are processed by the microprocessor or the counter associated therewith.

During this functioning, wear of the semi-circular contact 4 is virtually inevitable. By way of example and to give an idea, three possible lines of wear have been shown in dashed-and-dotted lines in FIG. 2.

In a first case, the elastic support 5 is assumed to be sufficiently rigid, despite its elasticity, in order, when it rotates in one direction or the other, not to tip downwardly in the direction of the movement and therefore to remain parallel to disc 1.

In such a case where the axis of the brush remains perpendicular to the plane of the disc 1, the brush 4 wears by friction along a plane parallel to that (here assumed to be horizontal) of this disc 1, the wear surface then obtained being, after a certain time of operation, the horizontal surface 8 indicated in dashed-and-dotted lines in FIG. 2.

It is then ascertained that the electrical contact is no longer made on the lower generatrix of the half-cylinder 4, but over the whole surface 8. Electrical contact with tooth 3 is then made earlier than before, and this electrical contact is broken later than previously. Consequently, the cyclic ratio of the pulses is modified, which falsifies measurement and may lead to erroneous controls.

Furthermore, considerable wear of the contacts may be the cause of short-circuits between the teeth.

In another case, the metallic support 5 is assumed to be very supple, which is often the case. The semi-cylindrical brush 4 then tips naturally forwardly in the direction of the natural tipping of its support 5, as indicated by the arrows in FIG. 2 (solid arrows when the support 5 moves towards the left, dashed-and-dotted arrows when support 5 moves towards the right). For examples with window raiser, the general movement of the support 5 is effected in a first direction (towards the left for example) when the window is raised, and in the opposite direction (towards the right in this example) when the window is lowered.

When the window rises, the demi-cylinder 4 will then wear on the surface indicated in dashed-and-dotted lines 9, while, when it lowers, the other surface 10 will wear. After a certain operational time, brush 4 is then transformed into a taper-edged blade 11 which will abrade the metallic track 2 until teeth 3 are totally or partially eliminated.

It is therefore an object of the present invention to overcome these various drawbacks.

SUMMARY OF THE INVENTION

To that end, the present invention relates to a contact brush adapted to move over an electrical track associated therewith which presents conducting parts and non-conducting parts, this contact brush being borne by an elastic, metallic support and being characterized in that it is composed of a metallic ball for contact and bearing on said track, this ball being crimped in a metallic shaft in the manner similar to that of a ball point pen, this metallic shaft being of a metal different from that of the ball and itself being fixed on said elastic, metallic support.

BRIEF DESCRIPTION OF THE DRAWINGS

The invention will be more readily understood on reading the following description with reference to the accompanying drawings, in which.

DESCRIPTION OF PREFERRED EMBODIMENT

Figure 2:
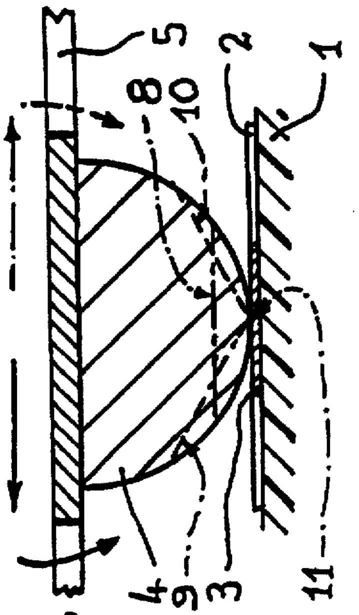
Fig. 2 PRIOR ART
FIGS. 1 and 2 which have already been described, illustrate the system of the prior art.
Figure 1:
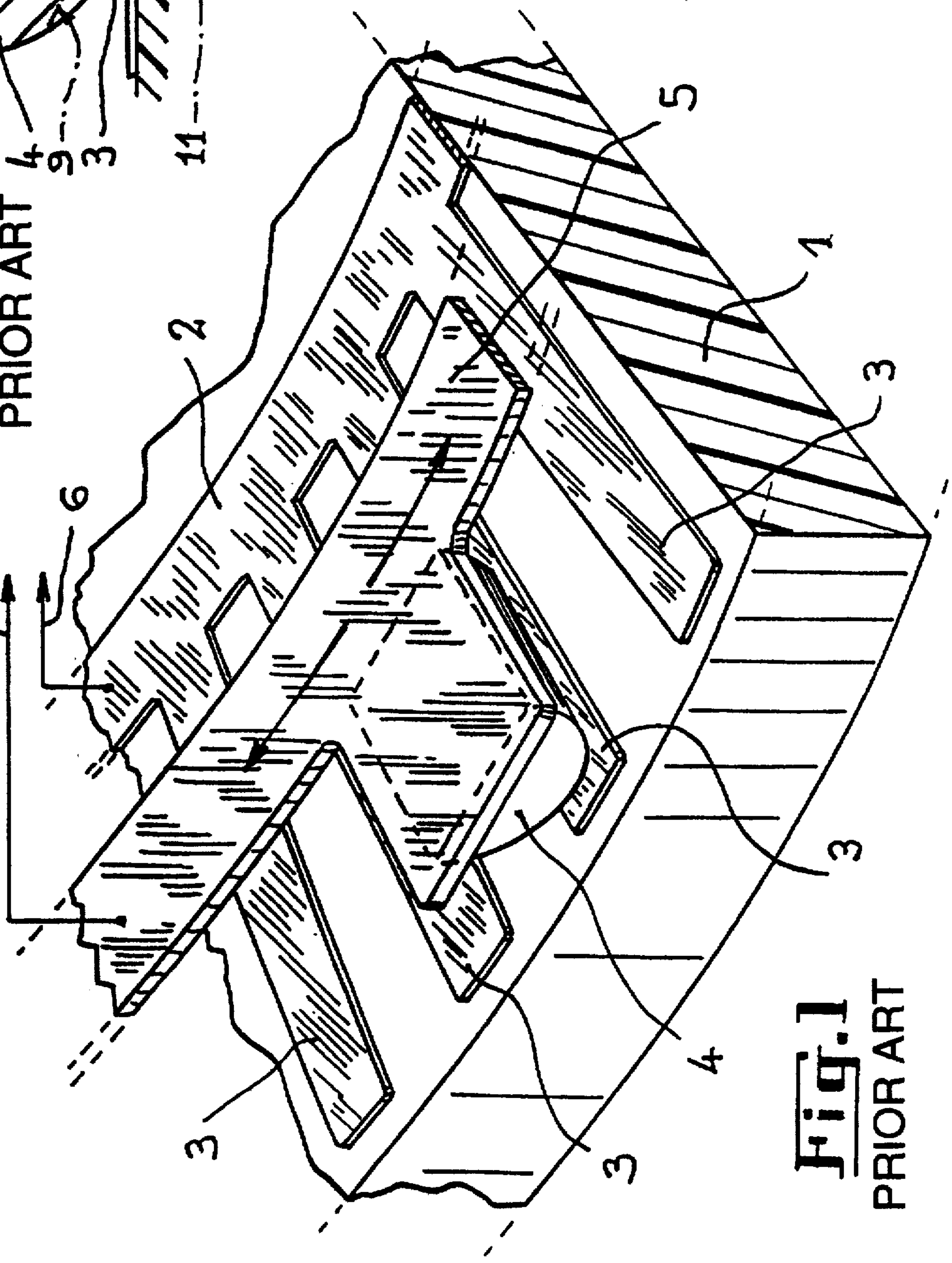
Fig. 1 PRIOR ART
Figure 3:
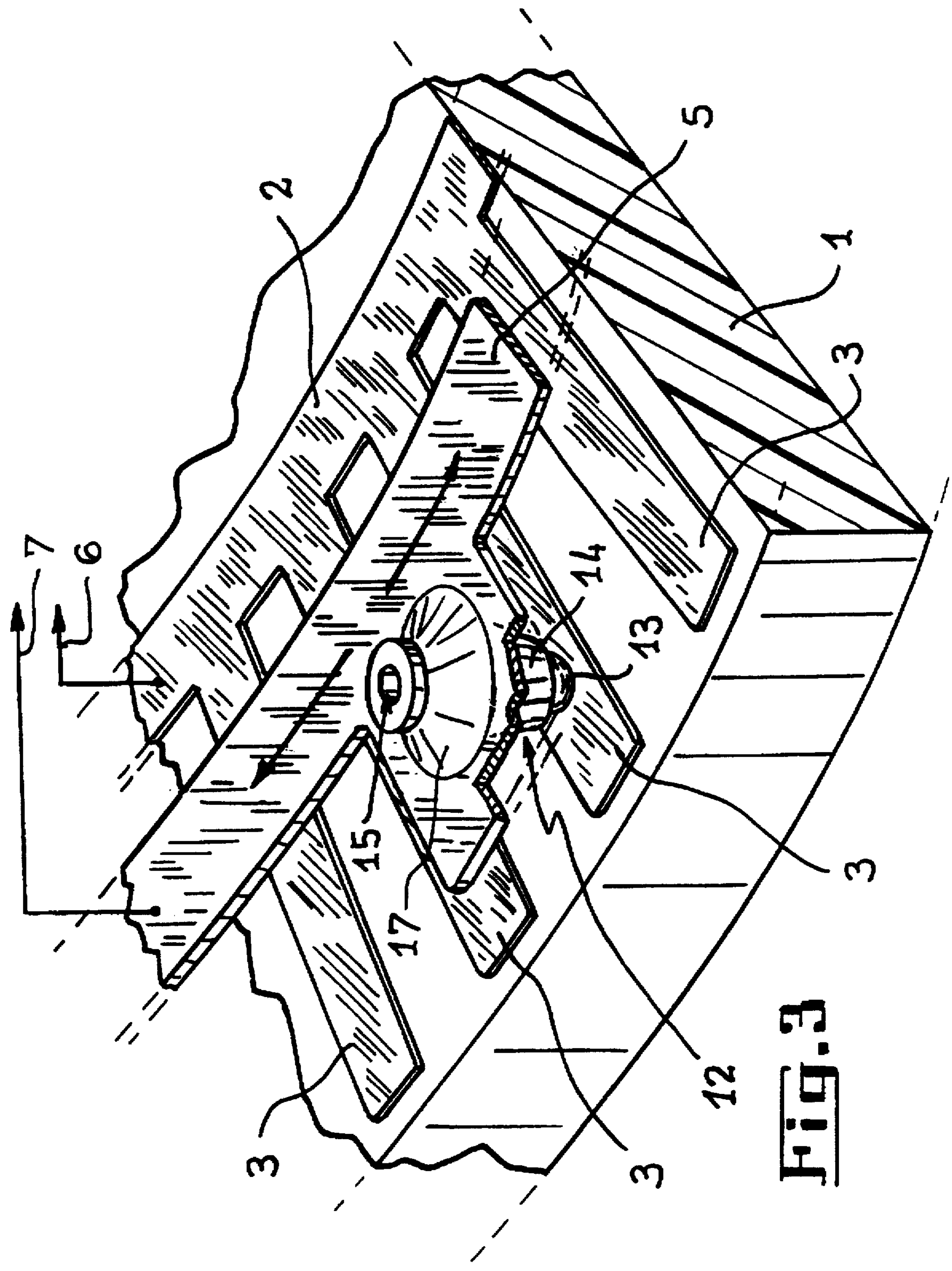
FIG. 3, which is similar to FIG. 1, schematically shows the brush of the invention in place on a commutation device.
Figure 5:
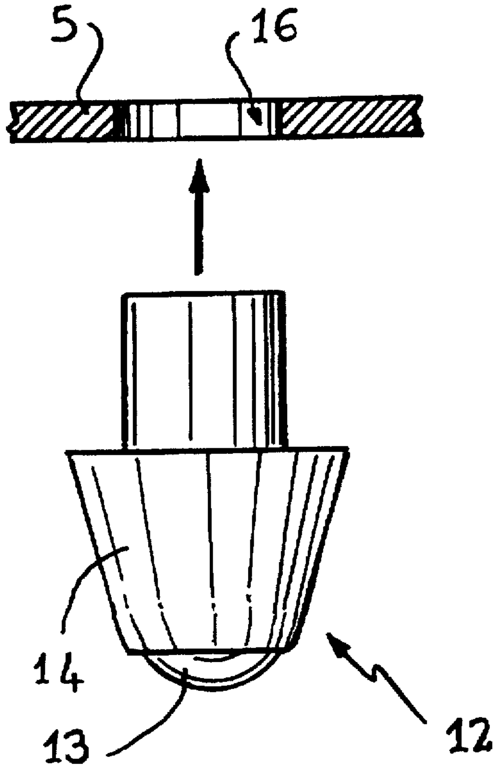
FIG. 5 shows the brush before it is positioned and welded on its metallic receiving support.
Figure 4:
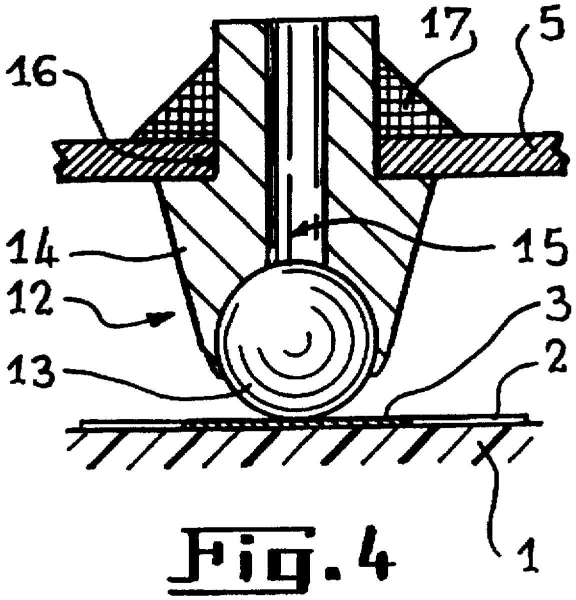
FIG. 4 is a view similar to FIG. 2, which shows in vertical and longitudinal section the brush of FIG. 3 positioned on the commutation device.

Referring again to the drawings, and this time to FIGS. 3 to 5, the embodiment shown therein differs from that of FIGS. 1 and 2 described hereinbefore, in that the wiper contact 4 is replaced by a rolling contact 12 similar in overall form to a ball point pen head.

This novel contact brush 12 is composed of a metallic ball 13, for example of tungsten carbide, which is crimped in a shaft 14 with truncated tip, this shaft being made of a metal different from that of the ball 13, such as brass for example.

An axial channel 15 traverses the shaft 14 as far as the ball 13 in order in particular to be able possibly to introduce therein a drop of electrically conducting lubrication liquid; this channel is consequently of sufficiently wide diameter.

The ball is advantageously made of a metal different from that with which the conducting tracks such as track 2 are ordinarily composed.

In this first embodiment, the contact brush 12 is, upon assembly, firstly introduced (FIG. 5) in an orifice 16 in the elastic, metallic support 5 then is welded (FIG. 4) on this support 5 by means of a welding bead 17.

Contact of the ball 13 on the conducting track 2, 3 is always made at one point, thereby substantially reducing, compared to prior art contact brushes, wear as the ball rotates whatever the direction of its displacement.

This contact is made in the same manner, whether the brush 12 be of axis perpendicular to the plane of the conducting track 2, 3 and its support 1, or whether it be inclined in any direction with respect to this plane, as explained hereinbefore with reference to FIGS. 1 and 2.

It should be noted that this latter result is obtained even if, according to another possible embodiment of the invention, the ball 13 is crimped firmly enough in order not to be able to rotate in its receiving shaft 14, the contact in that case being effected by a non-rotating ball in this simplified embodiment.

The diameter of the ball 13 is for example between 0.2 and 2 mm. It is for example advantageously equal to about 0.4 mm, the contact brush 12 finally being virtually identical to a ball-point pen point, preferably with fine ball.

It should also be noted that, in the preferred case described at present, where the ball 13 is rotatable, the latter also presents the advantage of being self-cleaning.

The connection between the shaft 14 and the ball 13 may be dry, lubricated or self-lubricated.

Figure 6:
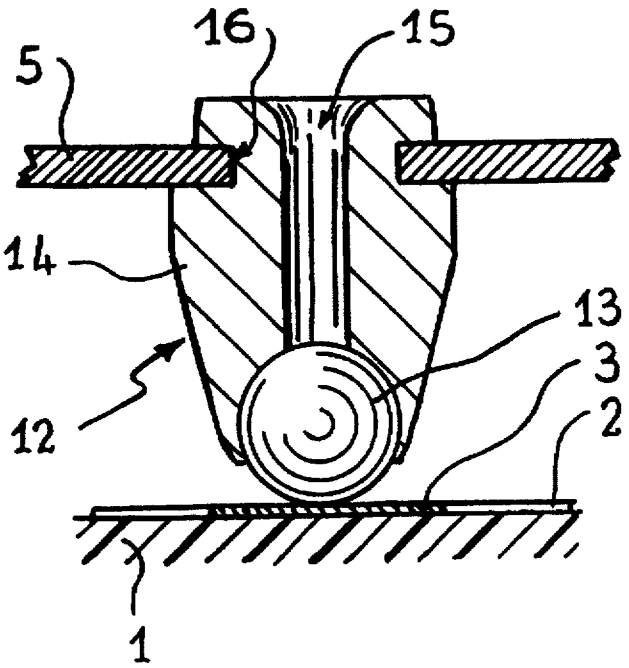
FIG. 6 is a view similar to FIG. 5, and showing how the brush may be rivetted, not welded, on the receiving support.
Figure 7:
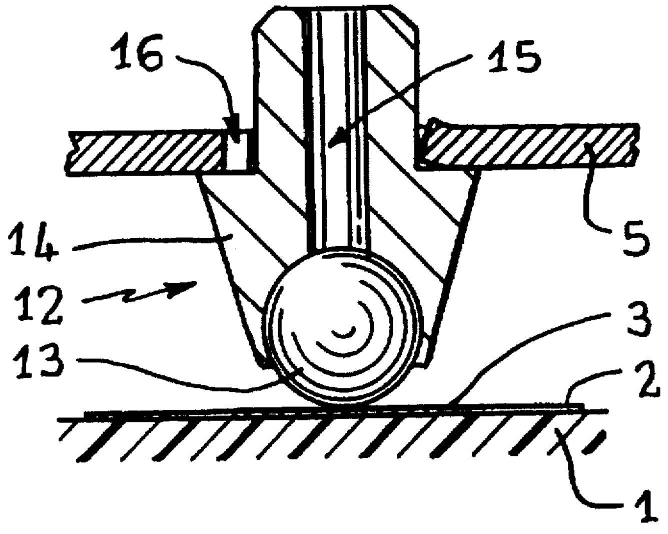
FIG. 7 is a view similar to FIGS. 5 and 6, and shows how the brush may be fixed by driving and self-clipping in an orifice in the support, previously cut out as shown, in plan view, in FIG. 8.
Figure 8:
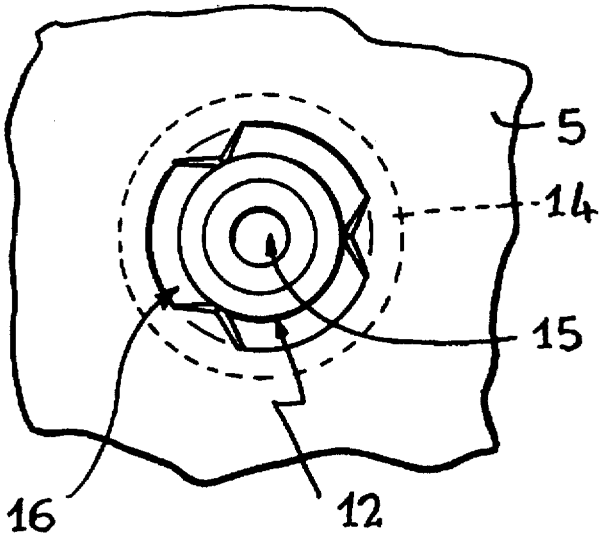
Figure 9:
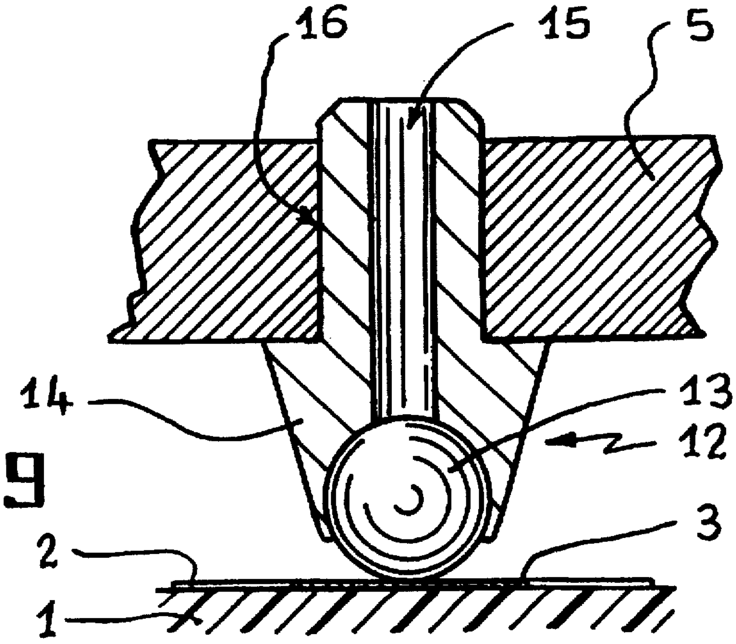
FIG. 9 is a view similar to FIGS. 5, 6 and 7, and shows how the brush may, if said support is thick enough, be fixed by simple drive in an orifice previously pierced to that end in this support.

It goes without saying that the invention is not limited to the embodiment which has just been described. For example, shaft 14, and therefore contact brush 12, may be mounted otherwise on its elastic support 5. For example,

- it may be riveted according to FIG. 6
- it may be fixed by drive and self-locking, according to FIGS. 7 and 8, in a suitable orifice 16 in the support 5, and
- according to FIG. 9, it may also be simply fixed by drive in a simple orifice 16 in the support 5, if this support is sufficiently thick.

What is claimed is:

1. An electrical contact brush for bearing on an electrical track associated therewith, said track having conducting parts and non-conducting parts, said electrical contact brush, comprising:
   - an elastic metallic support;
   - a metallic shaft having a bore extending therethrough fixed to said elastic metallic support; and
   - a metallic ball, comprising a metallic material different from that of said metallic shaft, rotatably mounted at one end of said metallic shaft and having at least a first portion thereof extending beyond said one end of said metallic shaft to bear on and make contact with the track, and a second portion diametrically opposed to said first portion exposed via said bore at another end of said metallic shaft.

2. The contact brush of claim 1, wherein said shaft is welded to said elastic metallic support.

3. The contact brush of claim 1, wherein said shaft is press fitted in a corresponding orifice in said elastic metallic support.

4. The contact brush of claim 1, wherein said shaft is riveted to said elastic metallic support.

5. The contact brush of claim 1, wherein said metallic shaft is crimped at said one end.

6. The contact brush of claim 1, wherein a diameter of said bore is sufficiently large such that a liquid for lubricating said metallic ball introduced at an opposite end of said shaft from said metallic ball will reach and lubricate said metallic ball.

7. The contact brush of claim 6, wherein the liquid for lubricating is electrically conductive.

* * * * *